DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 7, 1972

904 O.G. 9

T904,017

RADIOGRAPHIC ELEMENTS CONTAINING ANTIHALATION DYES

Allan G. Millikan, 5417 E. Hawthorne St., Tucson, Ariz. 85711, and Edward J. Seus, Kodak Park Works, Rochester, N.Y. 14650

Filed Apr. 21, 1972, Ser. No. 246,246
Int. Cl. G03c *1/84, 1/92, 1/02*
U.S. Cl. 96—84
No Drawing. 44 Pages Specification

Radiographic elements are comprised of a support on which there is coated a surface latent image silver halide emulsion layer and a fogged internal latent image silver halide emulsion layer and contain a dye in the fogged emulsion layer which is adsorbed to the silver halide grains and which functions to control halation. Typical dyes which are useful for this purpose are cyanine, complex cyanine, merocyanine and hemioxonol dyes. In processing of the element, the dye is removed together with the silver halide grains to which it is adsorbed. Elements in which the surface image emulsion layer is spectrally sensitized in the region of 600 to 650 nanometers, and in which the dye which is incorporated in the fogged emulsion layer to control halation absorbs in this same region, are especially advantageous. Incorporation of two different dyes in the fogged emulsion layer, such as a combination of anhydro-3,9-diethyl-5,5′-dimethoxy-3′-(3-sulfopropyl)thiacarbocyanine hydroxide and anhydro-3′,9-diethyl-5′-methoxy - 5 - phenyl-3-(3-sulfobutyl)oxaselenacarbocyanine hydroxide, is particularly useful.